United States Patent
Benicewicz et al.

(10) Patent No.: US 9,812,725 B2
(45) Date of Patent: Nov. 7, 2017

(54) PROTON-CONDUCTING MEMBRANE AND USE THEREOF

(71) Applicant: BASF SE, Ludwigshafen (DE)

(72) Inventors: Brian Benicewicz, Loudonville, NY (US); Sigmar Bräuninger, Hemsback (DE); Gordon Calundann, Somerset, NJ (US); Guoqing Qian, Irmo, SC (US)

(73) Assignee: BASF SE (DE)

( * ) Notice: Subject to any disclaimer, the term of this patent is extended or adjusted under 35 U.S.C. 154(b) by 811 days.

(21) Appl. No.: 13/742,774

(22) Filed: Jan. 16, 2013

(65) Prior Publication Data
US 2013/0183602 A1    Jul. 18, 2013

Related U.S. Application Data

(60) Provisional application No. 61/587,138, filed on Jan. 17, 2012.

(51) Int. Cl.
*H01M 8/103* (2016.01)
*C08J 5/22* (2006.01)
*H01M 8/1069* (2016.01)
*H01M 8/1086* (2016.01)

(52) U.S. Cl.
CPC ............ *H01M 8/103* (2013.01); *C08J 5/22* (2013.01); *H01M 8/1069* (2013.01); *H01M 8/1086* (2013.01); *Y02P 70/56* (2015.11)

(58) Field of Classification Search
CPC ... H01M 8/103; H01M 8/1086; H01M 8/1069
See application file for complete search history.

(56) References Cited

U.S. PATENT DOCUMENTS

| | | |
|---|---|---|
| 4,191,618 A | 3/1980 | Coker et al. |
| 4,212,714 A | 7/1980 | Coker et al. |
| 4,333,805 A | 6/1982 | Davidson et al. |
| 2004/0096734 A1 | 5/2004 | Calundann et al. |
| 2004/0127588 A1 | 7/2004 | Calumdann et al. |
| 2005/0244694 A1* | 11/2005 | Kiefer ............... C08F 230/02 521/27 |
| 2006/0008690 A1 | 1/2006 | Uensal et al. |
| 2006/0014065 A1 | 1/2006 | Pawlik et al. |
| 2006/0183012 A1 | 8/2006 | Uensal et al. |
| 2006/0210881 A1 | 9/2006 | Calundann et al. |
| 2008/0057358 A1 | 3/2008 | Calundann et al. |
| 2008/0280182 A1 | 11/2008 | Uensal et al. |
| 2009/0136818 A1 | 5/2009 | Fujibayashi et al. |
| 2009/0214920 A1 | 8/2009 | Uensal et al. |
| 2011/0065020 A1 | 3/2011 | Uensal et al. |
| 2011/0236563 A1 | 9/2011 | Leitner |
| 2011/0311901 A1 | 12/2011 | Fleischhaker et al. |
| 2012/0007263 A1 | 1/2012 | Leitner et al. |
| 2012/0101173 A1 | 4/2012 | Belack et al. |
| 2013/0183603 A1 | 7/2013 | Benicedwicz et al. |
| 2014/0199610 A1 | 7/2014 | Benicedwicz et al. |
| 2014/0199611 A1 | 7/2014 | Benicedwicz et al. |

FOREIGN PATENT DOCUMENTS

| | | |
|---|---|---|
| JP | 2001118591 A | 4/2001 |
| JP | 2006339065 A | 12/2006 |
| WO | WO-02/071518 A1 | 9/2002 |
| WO | WO-02/081547 A1 | 10/2002 |
| WO | WO-2004015797 A1 | 2/2004 |
| WO | WO-2010063489 A1 | 6/2010 |
| WO | WO-2010081698 A1 | 7/2010 |
| WO | WO-2010145828 A2 | 12/2010 |

OTHER PUBLICATIONS

International Search Report for PCT/IB2013/000050 dated May 30, 2013.
International Search Report for PCT/IB2013/000051 dated May 23, 2013.
U.S. Appl. No. 13/742,808.
U.S. Appl. No. 13/769,413.
U.S. Appl. No. 13/769,420.

* cited by examiner

*Primary Examiner* — Jeremiah Smith
(74) *Attorney, Agent, or Firm* — Drinker Biddle & Reath LLP

(57) ABSTRACT

A membrane obtainable by
A) mixing:
  (vii) aromatic tetraamino compounds and
  (viii) aromatic carboxylic acids or esters thereof which contain at least two acid groups per carboxylic acid monomer,
  or
  (ix) aromatic and/or heteroaromatic diaminocarboxylic acids, in polyphosphoric acid to form a solution and/or dispersion
B) heating the mixture from step A), and polymerizing until an intrinsic viscosity of at least 0.8 dl/g, is obtained for the polymer being formed,
C) adding polyazole polymers,
D) heating the mixture from step C),
E) applying a membrane layer using the mixture according to step D) on a carrier or an electrode,
F) treating the membrane formed in the presence of water and/or moisture,
G) removing the membrane from the carrier;
wherein the content of all polyazole polymers in the membrane is between 5% to 25% by weight and wherein the membrane has a Young Modulus is at least 2.0 MPa.

24 Claims, No Drawings

PROTON-CONDUCTING MEMBRANE AND USE THEREOF

CROSS-REFERENCE TO RELATED APPLICATIONS

This application claims benefit (under 35 USC 119(e)) of U.S. Provisional Application 61/587,138, filed Jan. 17, 2012, which is incorporated by reference.

The present invention relates to a novel proton-conducting polymer membrane based on polyazole polymers which, owing to their outstanding chemical and thermal properties, can be used widely and are suitable in particular as polymer electrolyte membrane (PEM) in so-called PEM fuel cells.

Polyazoles, for example polybenzimidazoles (Celazole®) have been known for sometime. Such polybenzimidazoles (PBIs) are prepared typically by reacting 3,3',4,4'-tetraaminobiphenyl with isophthalic acid or diphenylisophthalic acid or their esters thereof in the melt. The prepolymer formed solidifies in the reactor and is subsequently comminuted mechanically. Subsequently, the pulverulent prepolymer is finally polymerized in a solid-phase polymerization at temperatures of up to 400° C. and the desired polybenzimidazoles are obtained.

To prepare polymer films, the FBI, in a further step, is dissolved in suitable solvent, such as polar, aprotic solvents, for example by dimethylacetamide (DMAc), and a film is obtained by means of classical processes.

Proton-conducting, i.e. acid-doped, polyazole membranes for use in PEM fuel cells are already known. The basic polyazole films are doped with concentrated phosphoric acid or sulfuric acid and then act as proton conductors and separators in so-called polymer electrolyte membrane fuel cells (PEM fuel cells).

As a result of the outstanding properties of the polyazole polymers, such polymer electrolyte membranes, processed to give membrane-electrode assemblies (MEA), can be used in fuel cells at long-term operating temperatures above 100° C., in particular above 120° C. This high long-term operating temperature allows it to increase the activity of the noble metal-based catalysts present in the membrane-electrode assembly (MEA). Especially in the case of use of so-called reformates made from hydrocarbons, the reformer gas comprises significant amounts of carbon monoxide which typically have to be removed by a complicated gas workup or gas purification. The possibility of increasing the operating temperature allows distinctly higher concentrations of CO impurities to be tolerated on a long-term basis.

Use of polymer electrolyte membranes based on polyazole polymers firstly allows complicated gas workup or gas purification to be partly dispensed with and secondly allows the catalyst loading in the membrane-electrode assembly to be reduced. Both are unavoidable prerequisites for large-scale use of PEM fuel cells, since the costs for a PEM fuel cell system are otherwise too high.

The acid-doped polyazole-based polymer membranes known to date already exhibit a favorable property profile. However, owing to the applications desired for PEM fuel cells, especially in the automobile sector and decentralized power and heat generation (stationary sector), they are in need of improvement overall. Furthermore, the polymer membranes known to date have a high contact of dimethylacetamide (DMAc) which cannot fully be removed by means of known drying methods. The International patent application WO 02/071518 describes a polymer membrane based on polyazoles in which the DMAc contamination has been eliminated. Although such polymer membranes exhibit improved mechanical properties, specific conductivities do not exceed 0.1 S/cm (at 140° C.).

U.S. Patent Application 2004/0096734 describes a novel, second generation, polymer membrane based on polyazoles which is obtained starting from the monomers by polymerizing in polyphosphoric acid. In PEM fuel cells, especially in high-temperature PEM fuel cells, this membrane exhibits outstanding performance.

However, it has been found that these second generation polymer membrane are still in need of improvement with regard to their mechanical stress in order also to ensure use under extreme conditions. Especially, the robustness of the polymer membrane in a built-in MEA/fuel cell stack needs to further improved.

For certain applications, such as the automobile sector and residential appliances, a PEM fuel cell has to be able to withstand many start-stop cycles without problem, even after being at rest at extremely low external temperatures.

In addition to these requirements, a higher mechanical durability of the membrane is also advantageous in the production of the membrane-electrode assembly and fuel cell stacks. For instance, considerable forces act on the membrane in the lamination, so that good stretchability and resilience can be advantageous. Further forces are compression forces when assembling the fuel cell stack in which each of the laminated membrane-electrode assemblies is further compressed. Under certain conditions, it has been found that the existing polymer membrane based on polyazoles can have a tendency for creep thus causing lifetime problems.

It is an object of the present invention to provide acid-containing polymer membranes based on polyazoles, which (i) have the performance advantages of the polymer membrane based on polyazoles, (ii) have at least the specific conductivity, especially at operating temperatures above 100° C. and additionally do not need moistening of the fuel gas, of the polymer membrane based on polyazoles, (iii) have better mechanical strength in terms of creep resistance, (iv) have better mechanical strength in terms of higher elastic-modulus and (v) can be manufactured with existing equipment and established processes.

We have now found that a proton-conducting membrane based on polyazole polymers providing the above mentioned properties can be obtained when the underlying monomers for the polyazole polymer are suspended or dissolved in polyphosphoric acid and polymerized or polymerized up to a certain degree and concentration and these are then mixed or end-polymerized. In case the aforementioned polymerization was only up to a certain degree with additional polyazole polymer.

The present invention provides a proton-conducting polymer membrane based on polyazoles, obtainable by a process comprising the steps of
A) mixing:
  (i) one or more aromatic tetraamino compounds and
  (ii) one or more aromatic carboxylic acids or esters thereof which contain at least two acid groups per carboxylic acid monomer,
  or
  (iii) one or more aromatic and/or heteroaromatic diaminocarboxylic acids, in polyphosphoric acid to form a solution and/or dispersion
B) heating the mixture from step A), preferably under inert gas, and polymerizing until an intrinsic viscosity of at least 0.8 dl/g, preferably at least 1.0 dl/g, in particular at least 1.5 dl/g, is obtained for the polymer being formed,
C) addition of one or more polyazole polymers, D) heating the mixture from step C), preferably under inert gas, E) applying a membrane layer using the mixture according to step D) on a carrier or on an electrode, F) optionally heating the membrane on the carrier or electrode obtained from step E), G) treating the membrane formed in the presence of water and/or moisture, H) removal of the membrane from the carrier.

characterized in that the total content of all polyazole polymers in the membrane is at least 5% by weight and up to about 25% by weight and said total content includes any acids, such as polyphosphoric acid and/or phosphoric acid and water being present, said total content excluding however any optional additives.

Step A):

The aromatic and heteroaromatic tetraamino compounds used in accordance with the invention are preferably 2,3,5,6-tetraaminopyridine, 3,3',4,4'-tetraaminodiphenylsulfone, 3,3',4,4'-tetraaminodiphenyl ether, 3,3',4,4'-tetraaminobiphenyl, 1,2,4,5-tetraaminobenzene, 3,3',4,4'-tetraaminobenzophenone, 3,3',4,4'-tetraaminodiphenylmethane and 3,3',4,4'-tetraaminodiphenyldimethyl-methane and the salts of the aforementioned compounds, especially the mono-, di-, tri- and tetrahydrochloride salts.

The aromatic carboxylic acids used in accordance with the invention are preferably dicarboxylic acids, either alone or in combination with tricarboxylic acids and/or tetracarboxylic acids, the esters of the aforementioned dicarboxylic acids, tricarboxylic acids or tetracarboxylic acids, especially the C1-C20-alkyl esters or C5-C12-aryl esters, or the anhydrides of the aforementioned dicarboxylic acids, tricarboxylic acids or tetracarboxylic acids, or the acid chlorides of the aforementioned dicarboxylic acids, tricarboxylic acids or tetracarboxylic acids.

The aromatic carboxylic acids used in accordance with the invention are preferably dicarboxylic acids, most preferred pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,8-dihydroxynaphthalene-3,6-dicarboxylic acid, diphenylsulfone-4,4'-dicarboxylic acid, isophthalic acid, terephthalic acid, phthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, diphenyl ether 4,4'-dicarboxylic acid, benzophenone-4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid.

The diaminocarboxylic acids used in accordance with the invention are preferably diaminobenzoic acid and the mono and dihydrochloride derivatives of said acid, and also 1,2-diamino-3'-carboxy acid 4,4'-diphenyl ether.

The aromatic tricarboxylic acids or their C1-C20-alkyl ester or their C5-C12-aryl ester, or the acid anhydrides of said tricarboxylic acids, or the acid chlorides of said tricarboxylic acids, are preferably 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid.

The aromatic tetracarboxylic acids or their C1-C20-alkyl ester or their C5-C12-aryl ester, or the acid anhydrides of said tetracarboxylic acids, or the acid chlorides of said tetracarboxylic acids, are preferably 3,5,3',5'-biphenyltetracarboxylic acid; benzene-1,2,4,5-tetracarboxylic acid; benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The aromatic carboxylic acids used in accordance with the invention also include heteroaromatic carboxylic acids, preferably heteroaromatic dicarboxylic acids, heteroaromatic tricarboxylic acids and heteroaromatic tetracarboxylic acids, including their respective esters, in particular their C1-C20-alkyl ester or their C5-C12-aryl ester, or the acid anhydrides of said heteroaromatic acids, or the acid chlorides of said heteroaromatic acids.

Heteroaromatic carboxylic acids are understood to mean aromatic systems which contain at least one nitrogen, oxygen, sulfur or phosphorus atom in the aromatic. They are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or their C5-C12-aryl esters, or their acid anhydrides or their acid chlorides.

The content of tricarboxylic acid or tetracarboxylic acids (based on dicarboxylic acid used) is between 0 and 30 mol %, preferably 0.1 and 20 mol %, in particular 0.5 and 10 mol %.

In step A), preference is given to using mixtures of at least 2 different aromatic carboxylic acids. Particular preference is given to using mixtures comprising aromatic carboxylic acids together with heteroaromatic carboxylic acids. The mixing ratio of aromatic carboxylic acids to heteroaromatic carboxylic acids is in the range from 1:99 to 99:1, preferably from 1:50 to 50:1.

In particular, these mixtures are mixtures of N-heteroaromatic dicarboxylic acids and aromatic dicarboxylic acids. Nonlimiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl)ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

It has been found that if the total content of monomers in the mixture of step A) is chosen to low, which means that the total content of all polyazole polymers in the membrane being formed from such monomers is below 10% by weight, in particular below 8% by weight, most preferred below 5% by weight of the of the total content of all polyazole polymers in the membrane, including the polyphosphoric acid and/or phosphoric acid and water, excluding however any optional additives, the addition of further polyazole polymer is needed in order to obtain membranes with improved mechanical properties.

Usually, if the amount of monomers is below 10% by weight, in particular below 8% by weight, most preferred below 5% by weight, of the total mixture including the polyphosphoric acid, such need exists. However, in case derivatives of the acids, for example esters, are used as monomers, such amounts need to be adapted accordingly.

The polyphosphoric acid used in step A) is commercial polyphosphoric acid as obtainable, for example, from Riedel-de Haen. The term "polyphosphoric acid" refers to concentrated grades of phosphoric acid ($H_3PO_4$) above 100%. At these high concentrations, the individual $H_3PO_4$ units are polymerized by dehydration and the polyphosphoric acids can be expressed by the formula $H_{n+2}P_nO_{3n+1}$ (n>1).

Preferably, the polyphosphoric acids [$H_{n+2}P_nO_{3n+1}$ (n>1)] have a content, calculated as $P_2O_5$ (by acidimetry), of at least 70% by weight. More preferred are polyphosphoric acids [$H_{n+2}P_nO_{3n+1}$ (n>1)] having a content, calculated as $P_2O_5$ (by acidimetry), of at least 75% by weight, most preferred are at least 82% by weight. The upper limit for the $P_2O_5$ content is typically about 86% by weight. Instead of a solution of the monomers, it is also possible to obtain a dispersion/suspension of the monomers in the polyphosphoric acid.

Step B):

The polymerization in steps B) is carried out at a temperature and for a time until an intrinsic viscosity of at least 0.8 dl/g, preferably at least 1.0 dl/g, in particular at least 1.5 dl/g, is obtained for the polyazole polymer to be formed. Typically, the temperatures are up to 220° C., preferably up to 200° C., in particular from 100° C. to 195° C. The time is typically from a few minutes (5 minutes) up to several hours (100 hours). Preferably, the heating is done stepwise, in particular in at least three steps, each step lasting from 10 minutes to 5 hours and increasing the temperature by at least 15° C. for each step. However, a skilled polymer expert knows that the above conditions depend upon the reactivity and concentration of the particular monomers.

Step C):

Typically, the polyazole polymer(s) added in step C) are selected from those containing repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII) as listed later on.

Preferred polyazole polymer(s) added in step C) are those containing repeat benzimidazole units are represented by the following formulae:

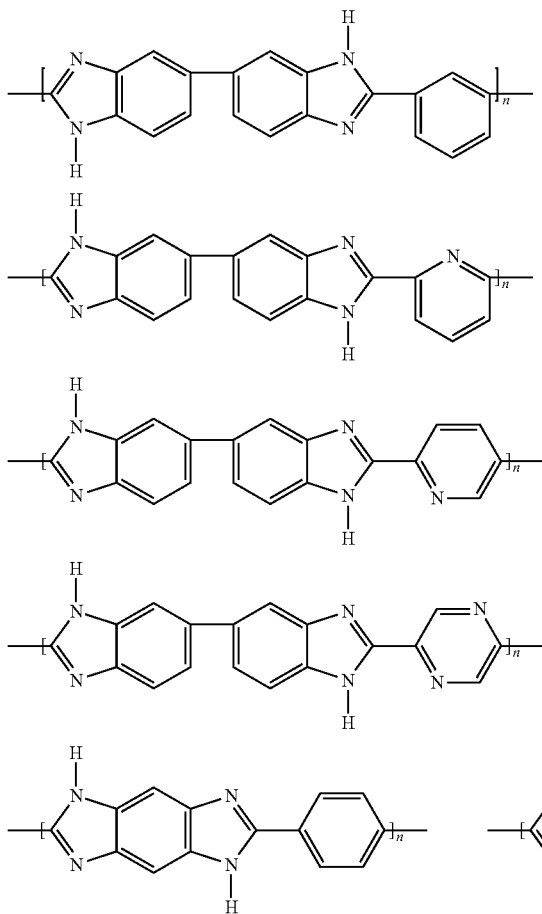

-continued

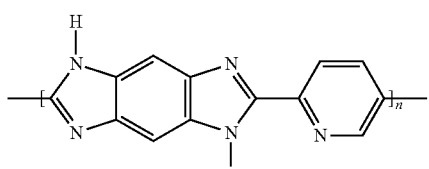
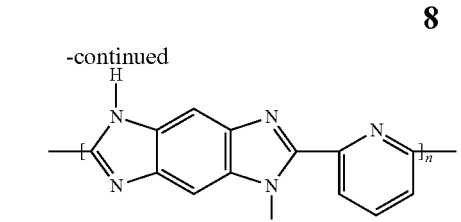

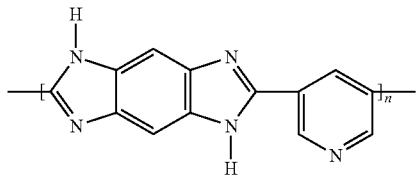
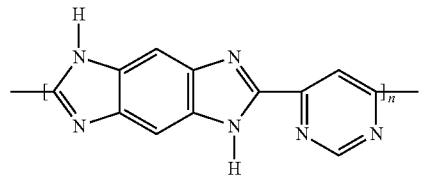

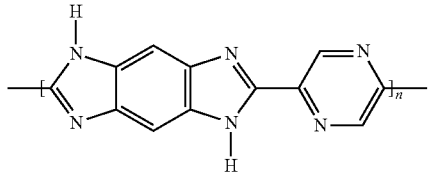
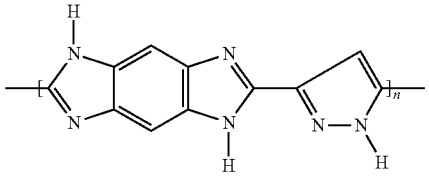

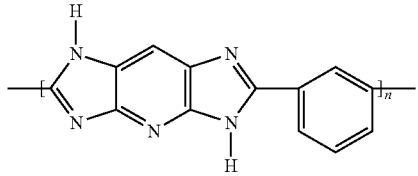
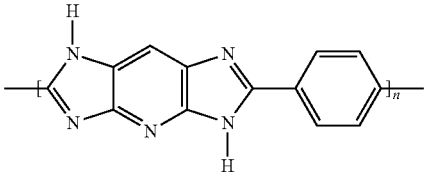

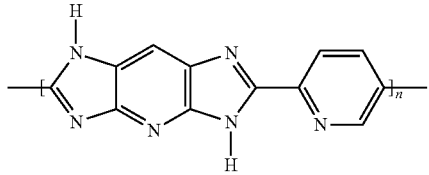
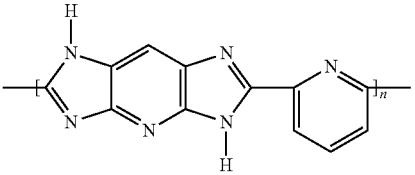

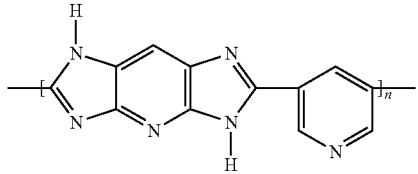
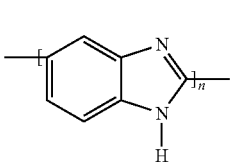

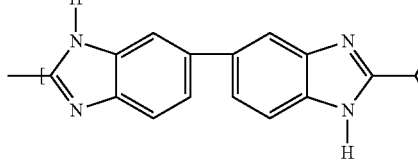

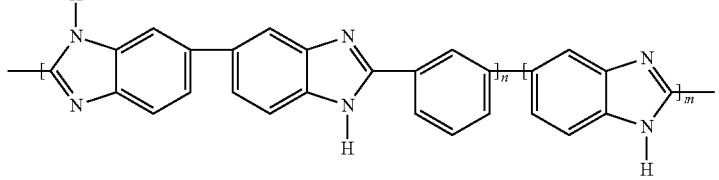

where n and m are each an integer greater than or equal to 10, preferably greater than or equal to 100.

Most preferred the polyazole polymer(s) added in step C) are the same polyazoles being formed in step B). In this context so called meta-Polybenzimidazoles and para-Polybenzimidazoles are preferred at most.

Typically, the amounts added in step C) are sufficient to cause a total content of all polyazole polymers in the final membrane which is preferably at least 5% by weight and up to about 25% by weight, in particular at least 8% by weight and up to about 25% by weight, most preferred at least 10% by weight and up to about 25% by weight of the total weight of the membrane including acids, such as polyphosphoric acid and/or phosphoric acid, water, excluding however any optional additives.

Step D):

The heating in step D) is required to secure proper dissolution or partial dissolution of the polyazole being added in step C). Further, the heating is applied when the polymerization in step B) results in an intrinsic viscosity of less than 1.0 dl/g, preferably less than 1.5 dl/g to cause further polymerization up to an intrinsic viscosity of at least 1.5 dl/g, is obtained. Such heating is carried out at a temperature and for a time until the aforementioned intrinsic viscosity is at least 1.5 dl/g, preferably at least 2.0 dl/g, is obtained.

Typically, the temperatures for heating in step D) are up to 350° C. for shorter periods of less than one hour, most suitable is heating up to 250° C. The time for such heating is typically from at least 10 minutes up to several hours (10 hours). However, a skilled polymer expert knows that the above conditions depend upon the reactivity of the particular monomers Step E):

The membrane formation according to step E) is effected by means of measures known per se (casting, spraying, knife-coating), which are known from the prior art for polymer film production. Suitable carriers are all carriers which can be referred to as inert under the conditions. To adjust the viscosity, the solution can optionally be admixed with phosphoric acid (most typically conc. phosphoric acid, 85%). This allows the viscosity to be adjusted to the desired value and the formation of the membrane to be facilitated.

The membrane obtained according to step E) has a thickness between 20 and 4000 m, preferably between 30 and 3500 μm, in particular between 50 and 1000 μm.

Step F):

The optionally heating in step F) is required to secure proper polymerization of the polyazole being formed and proper dissolution of the polyazole added. The heating is applied when the polymerization in step B) or C) results in an intrinsic viscosity of less than 1.5 dl/g, preferably less than 2.0 dl/g to cause further polymerization up to an intrinsic viscosity of at least 1.5 dl/g, preferably of at least 2.0 dl/g, is obtained. Such heating is carried out at a temperature and for a time until the aforementioned intrinsic viscosity is at least 1.5 dl/g, preferably of at least 2.0 dl/g, is obtained.

In addition, the heating can be used to increase the concentration of the polyphosphoric/phosphoric acids being present which may face dilution due to the formation of water during the polycondensation.

Typically, the temperatures for heating in step F) are up to 350° C. for shorter periods of less than one hour, most suitable is heating up to 250° C. The time for such heating is typically from at least 10 minutes up to several hours (10 hours). However, a skilled polymer expert knows that the above conditions depend upon the reactivity of the particular monomers Polyazole:

The polymer formed in step B) contains repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

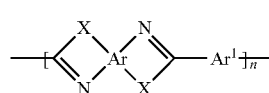

(I)

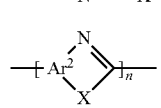

(II)

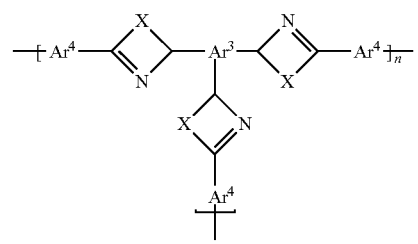

(III)

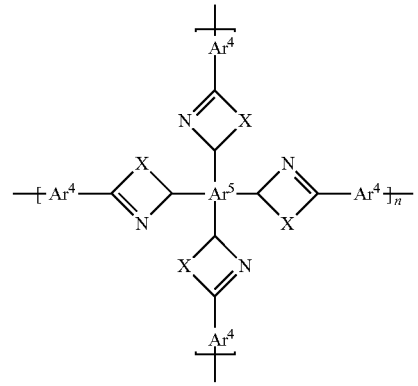

(IV)

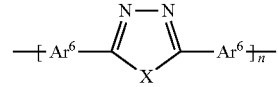

(V)

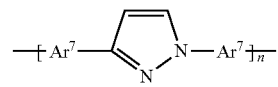

(VI)

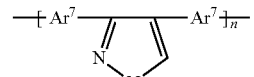

(VII)

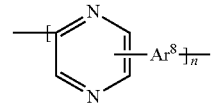

(VIII)

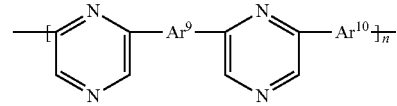

(IX)

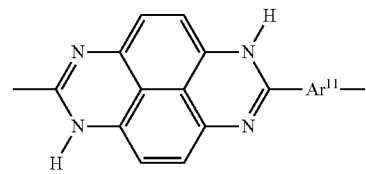

(X)

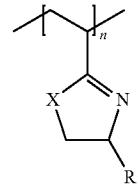

(XI)

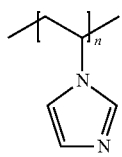 (XII)

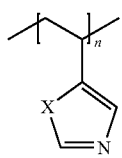 (XIII)

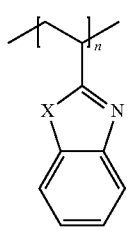 (XIV)

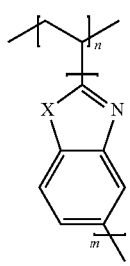 (XV)

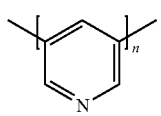 (XVI)

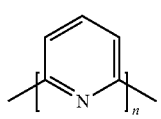 (XVII)

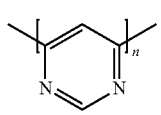 (XVIII)

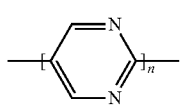 (XIX)

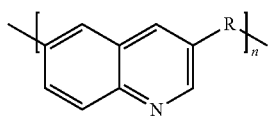 (XX)

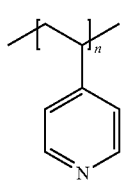 (XXI)

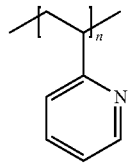 (XXII)

in which

Ar are the same or different and are each a tetravalent aromatic or heteroaromatic group which may be mono- or polycyclic, $Ar^1$ are the same or different and are each a divalent aromatic or heteroaromatic group which may be mono- or polycyclic, $Ar^2$ are the same or different and are each a di- or trivalent aromatic or heteroaromatic group which may be mono- or polycyclic, $Ar^3$ are the same or different and are each a trivalent aromatic or heteroaromatic group which may be mono- or polycyclic, $Ar^4$ are the same or different and are each a trivalent aromatic or heteroaromatic group which may be mono- or polycyclic, $Ar^5$ are the same or different and are each a tetravalent aromatic or heteroaromatic group which may be mono- or polycyclic, $Ar^6$ are the same or different and are each a divalent aromatic or heteroaromatic group which may be mono- or polycyclic, $Ar^7$ are the same or different and are each a divalent aromatic or heteroaromatic group which may be mono- or polycyclic, $Ar^8$ are the same or different and are each a trivalent aromatic or heteroaromatic group which may be mono- or polycyclic, $Ar^9$ are the same or different and are each a di- or tri- or tetravalent aromatic or heteroaromatic group which may be mono- or polycyclic, $Ar^{10}$ are the same or different and are each a di- or trivalent aromatic or heteroaromatic group which may be mono- or polycyclic, $Ar^{11}$ are the same or different and are each a divalent aromatic or heteroaromatic group which may be mono- or polycyclic, X are the same or different and are each oxygen, sulfur or an amino group which bears a hydrogen atom, a group having 1-20 carbon atoms, preferably a branched or unbranched alkyl or alkoxy group, or an aryl group as further radical, R is the same or different and is hydrogen, an alkyl group or an aromatic group, with the proviso that R in formula (XX) is not hydrogen, and n, m are each an integer greater than or equal to 10, preferably greater than or equal to 100.

The term "azole" means that the polymer has at least one repeating unit comprising an aromatic ring in which at least one nitrogen heteroatom is present in said aromatic ring.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, acridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is as desired; in the case of phenylene, for example, $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups derive from benzene and biphenylene, which may optionally also be substituted.

Preferred alkyl groups are short-chain alkyl groups having from 1 to 4 carbon atoms, for example methyl, ethyl, n- or i-propyl and t-butyl groups.

Preferred aromatic groups are phenyl or naphthyl groups. The alkyl groups and the aromatic groups may be substituted.

Preferred substituents are halogen atoms, for example fluorine, amino groups, hydroxy groups or short-chain alkyl groups, for example methyl or ethyl groups.

Preference is given to polyazoles having repeat units of the formula (I) in which the X radicals are the same within one repeat unit.

The polyazoles may in principle also have different repeat units which differ, for example, in their X radical. However, it preferably has only identical X radicals in a repeat unit.

Further preferred polyazole polymers are polyimidazoles, polybenzothiazoles, polybenzooxazoles, polyoxadiazoles, polyquinoxalines, polythiadiazoles, poly(pyridines), poly(pyrimidines) and poly(tetraazapyrenes).

In a further embodiment of the present invention, the polymer containing repeat azole units is a copolymer or a blend which contains at least two units of the formula (I) to (XXII) which differ from one another.

The number of repeat azole units in the polymer is preferably an integer greater than or equal to 10. Particularly preferred polymers contain at least 100 repeat azole units.

In the context of the present invention, preference is given to block polymers containing repeat benzimidazole units. Some examples of the highly appropriate polymers containing repeat benzimidazole units are represented by the following formulae:

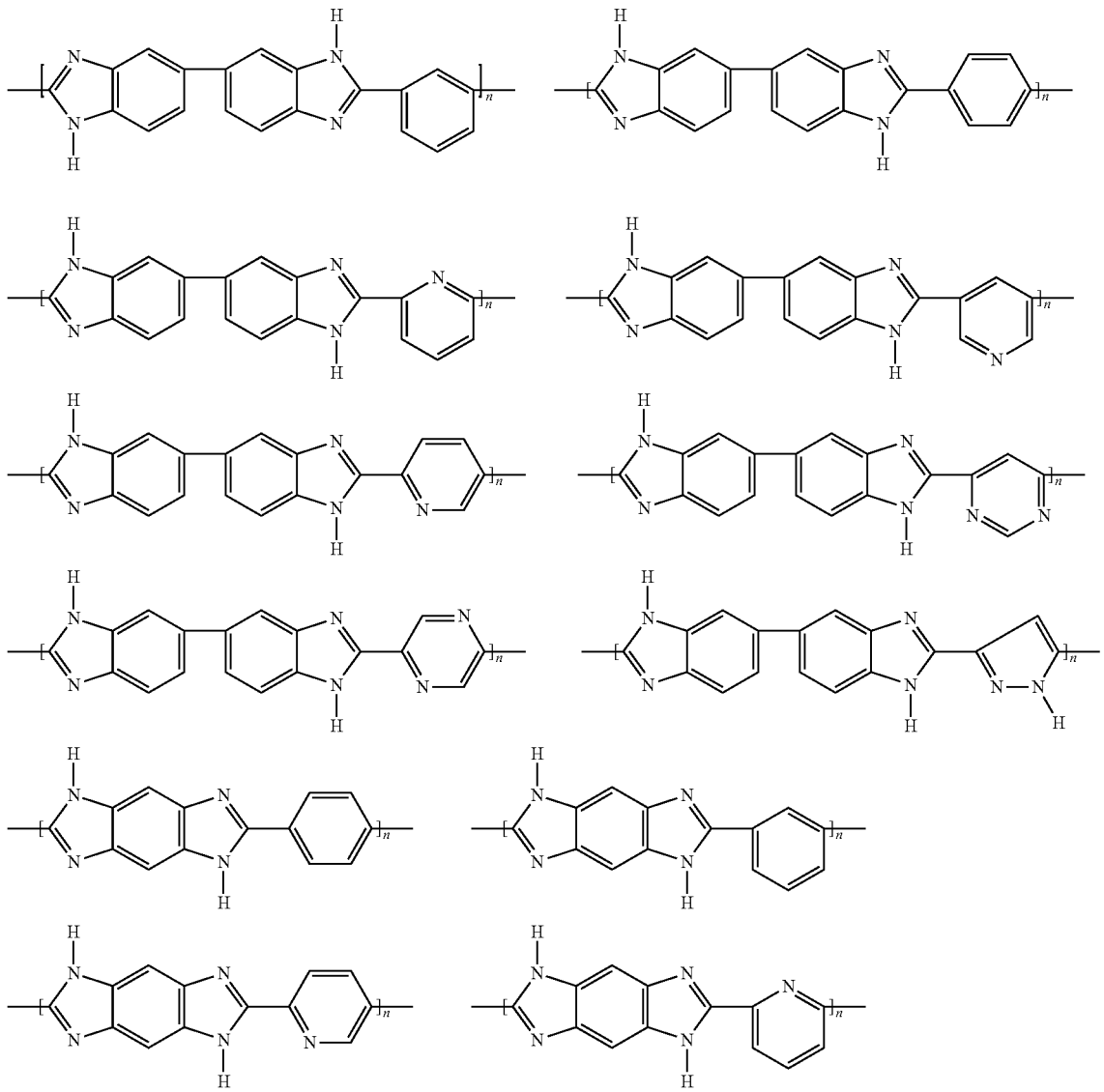

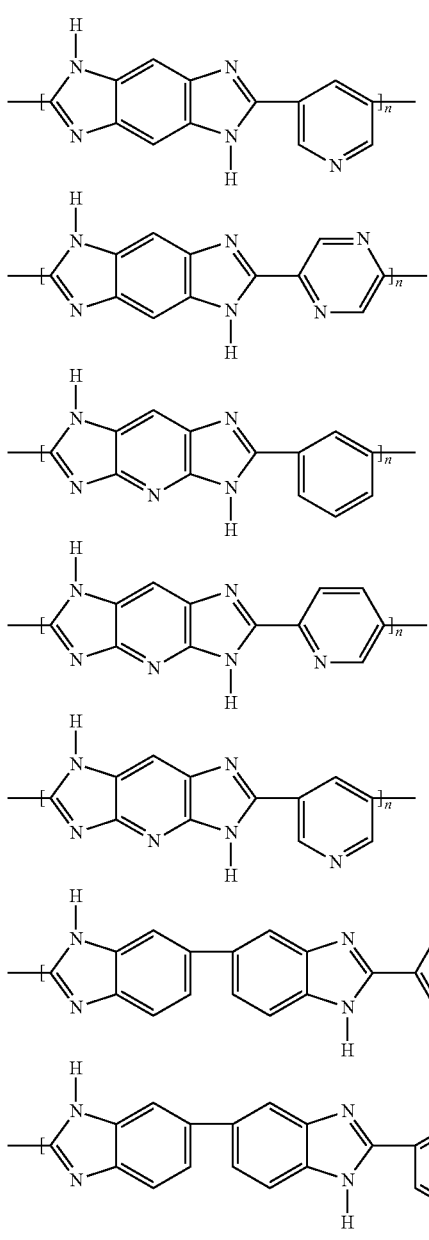
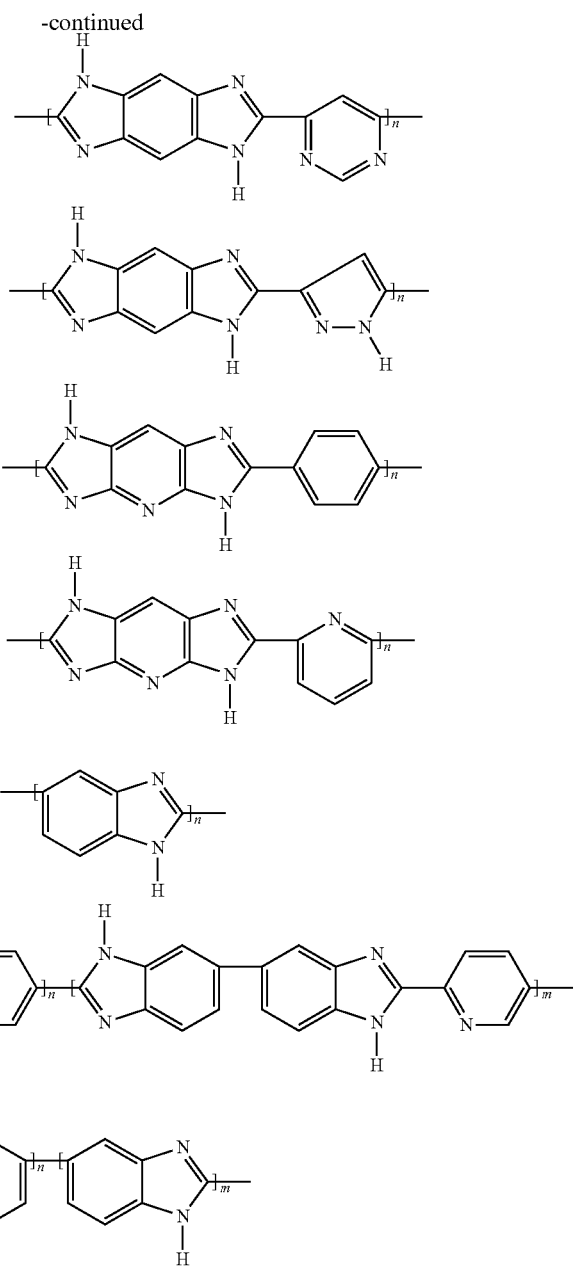

where n and m are each an integer greater than or equal to 10, preferably greater than or equal to 100.

When the mixture according to step A) also comprises tricarboxylic acids or tetracarboxylic acid, this achieves branching/crosslinking of the polymer formed. This contributes to improving the mechanical properties.

Step G)

The membrane obtained according to step E) or F), if the optional heating is performed, is treated in the presence of water and/or moisture (step G). Such treatment is a hydrolysis of the polyphosphoric/phosphoric acid being present from the preceding steps and causes a sol-gel transfer of the polyazole/polyphosphoric/phosphoric acid mixture. The hydrolysis treatment is performed at temperatures and for a time sufficient for the membrane to have sufficient strength for use in fuel cells. The treatment can be effected to the extent that the membrane is self-supporting, so that it can be removed from the carrier without damage.

The treatment of the membrane in step G) typically is done at temperatures above 0° C. and less than 150° C., preferably at temperatures between 10° C. and 120° C., in particular between room temperature (20° C.) and 90° C., in the presence of moisture and/or water and/or steam and/or aqueous phosphoric acid. The treatment is effected preferably under standard pressure, but may also be effected under the action of pressure. It is important that the treatment is done in the presence of sufficient moisture, as a result of which the polyphosphoric acid present contributes to the strengthening of the membrane by virtue of partial hydrolysis to form low molecular weight polyphosphoric acid and/or phosphoric acid.

The at least partial hydrolysis of the polyphosphoric acid in step G) leads to strengthening of the membrane and to a decrease in the layer thickness and formation of a membrane having a thickness between 15 and 3000 μm, preferably between 20 and 2000 μm, in particular between 20 and 1500 μm, which is self-supporting. The intra- and intermolecular structures present in the polyphosphoric acid layer (inter-penetrating networks, IPN) lead to ordered membrane formation which draws responsible for the particular properties of the membranes formed.

The upper temperature limit of the treatment according to step G) is generally 150° C. In the case of extremely brief action of moisture, for example of superheated steam, this steam may also be hotter than 150° C. The essential condition for the upper temperature limit is the duration of treatment.

The treatment in step G) can also be effected in climate-controlled chambers in which the hydrolysis can be controlled under defined action of moisture. In this case, the moisture can be adjusted in a controlled manner by the temperature or saturation of the contacting environment, for example gases such as air, nitrogen, carbon dioxide or other suitable gases, or steam. The treatment time is dependent upon the parameters selected above. If the humidity of the environmental air is sufficient (typically 35-100% relative humidity), it is also possible to perform the hydrolysis at room temperatures (typically 20° C.).

The treatment time is also dependent upon the thickness of the membrane.

In general, the treatment time is between a few seconds to minutes, for example under reaction of superheated steam, or up to whole days, for example under air at room temperature and low relative atmospheric moisture. The treatment time is preferably between 10 seconds and 300 hours, in particular from 1 minute to 200 hours.

When the at least partial hydrolysis is carried out at room temperature (20° C.) with ambient air of relative atmospheric moisture content of 40-80%, the treatment time is between 5 and 200 hours.

The membrane obtained from step G) is typically self-supporting and can be removed from the carrier without damage and subsequently optionally be further processed directly. In case the membrane in step E) is formed on an electrode directly, the removal of any carrier in not required.

It is possible via the degree of hydrolysis, i.e. the time, temperature and atmospheric moisture content, to adjust the concentration of phosphoric acid and hence the conductivity of the inventive polymer membrane. According to the invention, the concentration of phosphoric acid is reported as mole of acid per mole of repeat unit of the polymer. In the context of the present invention, preference is given to a concentration (mole of phosphoric acid based on a repeat unit of the formula (III), i.e. polybenzimidazole) of at least 10, preferably of at least 15, in particular of at least 20.

Such high degrees of doping (concentrations) are obtainable with greatest difficulties, if at all, by doping polyazoles with commercially available ortho-phosphoric acid, because such later doping causes non-uniform membranes having portions in which the membrane is already dissolved by the acid, in particular phosphoric acid. The polyazole membranes described in the International patent application WO 02/081547 also exhibit high phosphoric acid content, however the inventive polymer membranes show an significantly improved creep behavior. Such improved creep behavior can be expressed as by the Young's Modulus.

Such mechanical properties of the membranes according to the instant invention were measured by cutting dumb bell specimens (ASTM D683 Type V) from the bulk membrane using a cutting press. Tensile properties were measured using an Instron Tensile Tester (5543A) with a 10N load cell. All measurements were made at room temperature on samples preloaded to 0.1N with a crosshead speed of 5 mm per minute.

The membranes according to the instant invention showed higher Young's modulus compared to membrane known from International patent application WO 02/081547.

The membranes according to the instant invention have a Young's modulus of at least 2.0 Mpa, preferably at least 3.0 MPa, most preferred at least 4.5 MPa. Such Young's modulus are measured on a membrane having a thickness of 0.43 mm and a content of 5% by weight of polyazole polymer, in particular polybenzimidazole.

The total content of all polyazole polymers in the membrane is preferably at least 5% by weight and up to about 25% by weight, in particular at least 8% by weight and up to about 25% by weight, most preferred at least 10% by weight and up to about 25% by weight of the total weight of the membrane including acids, such as polyphosphoric acid and/or phosphoric acid, water, excluding however any optional additives.

It is thus possible to provide more robust proton conductive membranes which translate into more robust membrane-electrode assemblies while maintaining the other important properties, such as conductivity, electrochemical performance and durability. In particular, the instant invention allows for the manufacture of membrane-electrode assemblies (MEA) which do not require a subgasket as disclosed in WO 2004/015797.

Further Possible Treatment of the Membrane:

After the treatment according to step G) or H), the membrane can also be crosslinked on the surface by reaction of heat in the presence of atmospheric oxygen. This curing of the membrane surface improves the properties of the membrane additionally.

The crosslinking can also be effected by the action of IR or NIR (IR=infrared, i.e. light having a wavelength of more than 700 nm; NIR=near IR, i.e. light having a wavelength in the range from approx. 700 to 2000 nm or an energy in the range from approx. 0.6 to 1.75 eV). A further method is irradiation with β-rays. The radiation dose here is between 5 and 200 kGy.

The inventive polymer membrane has improved material properties compared to the doped polymer membranes known to date. In particular, due to their higher creep resistance, they exhibit better performance in comparison with known doped polymer membranes. In addition the inventive polymer membrane shows higher elastic-modulus as explained before.

Typically, the inventive polymer membrane show a good proton conductivity of at least 0.1 S/cm, preferably at least 0.13 S/cm, in particular at least 0.15 S/cm, measured at temperatures of 160° C. without additional humidification.

To further improve the performance properties, it is additionally possible to add fillers, especially proton-conducting fillers, and also additional acids to the membrane. The addition may be effected either in step A), B), C) and/or D).

Nonlimiting examples of proton-conducting fillers are
Sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$,
Phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, Polyacid such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ Selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, Oxides such as $Al_2O_3$, $Sb_2O_5$, $ThO_2$, $SnO_2$, $ZrO_2$, $MoO_3$ Silicates such as zeolites, zeolites($NH_4+$), sheet silicates, framework silicates, H-natrolites, H-mordenites, $NH_4$-analcines, $NH_4$-sodalites, $NH_4$-gallates, H-montmorillonites Acids such as $HClO_4$, $SbF_5$ Fillers such as carbides, in particular SiC, $Si_3N_4$, fibers, in particular glass fibers, glass powders and/or polymer powders being different from the described polyazoles.

In addition, this membrane may also contain perfluorinated sulfonic acid additives (0.1-20% by weight, preferably 0.2-15% by weight, very preferably 0.2-10% by weight). These additives lead to enhancement of performance, to an increase in the oxygen solubility and oxygen diffusion close to the cathode and to a reduction in the adsorption of phosphoric acid and phosphate on platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of persulfonated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutane sulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

In addition, the membrane may also comprise as additives which scavenge (primary antioxidants) or destroy (secondary antioxidants) the peroxide radicals generated in oxygen reduction in the course of operation and thus, as described in JP2001118591 A2, improve lifetime and stability of the membrane and membrane-electrode unit. The way in which such additives function and their molecular structures are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998. Nonlimiting examples of such additives are: bis(trifluoromethyl) nitroxide, 2,2-diphenyl-1-picrinylhydrazyl, phenols, alkylphenols, sterically hindered alkylphenols, for example Irganox, aromatic amines, sterically hindered amines, for example Chimassorb; sterically hindered hydroxylamines, sterically hindered alkylamines, sterically hindered hydroxylamines, sterically hindered hydroxylamine ethers, phosphites, for example Irgafos, nitrosobenzene, methyl-2-nitrosopropane, benzophenone, benzaldehyde tert-butyl nitron, cysteamine, melanines, lead oxides, manganese oxides, nickel oxides, cobalt oxides.

Possible fields of use of the inventive doped polymer membranes include use in fuel cells, in electrolysis, in capacitors and in battery systems. Owing to their property profile, the proton conductive polymer membranes are preferably used in fuel cells.

The present invention also relates to a membrane-electrode unit which has at least one inventive polymer membrane. For further information about membrane-electrode units, reference is made to the technical literature, especially to the U.S. Pat. Nos. 4,191,618, 4,212,714 and 4,333,805. The disclosure present in the aforementioned references, U.S. Pat. Nos. 4,191,618, 4,212,714 and 4,333,805, with regard to the construction and the production of membrane-electrode units, and also the electrodes, gas diffusion layers and catalysts to be selected, also forms part of the description.

In one variant of the present invention, the membrane can also be formed directly on the electrode instead of on a carrier. This allows the treatment according to step E) to be shortened appropriately, since the membrane no longer has to be self-supporting. Such a membrane also forms part of the subject matter of the present invention.

The present invention further provides an electrode which having a proton-conducting polymer coating based on polyazoles, obtainable by a process comprising the steps of A) mixing:
   (iv) one or more aromatic tetraamino compounds and
   (v) one or more aromatic carboxylic acids or esters thereof which contain at least two acid groups per carboxylic acid monomer,
   or
   (vi) one or more aromatic and/or heteroaromatic diaminocarboxylic acids, in polyphosphoric acid to form a solution and/or dispersion B) heating the mixture from step A), preferably under inert gas, and polymerizing until an intrinsic viscosity of at least 0.8 dl/g, preferably at least 1.0 dl/g, in particular at least 1.5 dl/g, is obtained for the polymer being formed, C) addition of one or more polyazole polymer, D) heating the mixture from step C), preferably under inert gas, E) applying a layer using the mixture according to step D) on an electrode, F) optionally heating the layer on the electrode obtained from step E), G) treating the membrane formed in step G) in the presence of water and/or moisture, characterized in that the total content of all polyazole polymers in the membrane is at least 5% by weight and up to about 25% by weight and said total content includes any acids, such as polyphosphoric acid and/or phosphoric acid and water being present, said total content excluding however any optional additives.

The variants and preferred embodiments described above are also valid for this subject matter, so that there is no need to repeat them at this point.

After step G), the membrane has a thickness between 2 and 3000 μm, preferably between 3 and 2000 μm, in particular between 5 and 1500 μm.

General test methods:

Test Method for IEC

The conductivity of the membrane depends greatly upon the content of acid groups expressed by the so-called ion exchange capacity (IEC). To measure the ion exchange capacity, a sample with a diameter of 3 cm is stamped out and introduced into a beaker filled with 100 ml of water. The released acid is titrated with 0.1 M NaOH. Subsequently, the sample is withdrawn, excess water is dabbed off and the sample is dried at 160° C. over 4 h. The dry weight, $m_0$, is then determined gravimetrically with a precision of 0.1 mg. The ion exchange capacity is then calculated from the consumption of 0.1M NaOH up to the first titration end point, $V_1$ in ml, and the dry weight, $m_0$ in mg, by the following formula:

$$IEC = V_1 * 300 / m_0$$

Test Method for Specific Conductivity

The specific conductivity is measured by means of impedance spectroscopy in a 4-pole arrangement in potentiostatic mode and using platinum electrodes (wire, diameter 0.25 mm). The distance between the current-collecting electrodes is 2 cm. The resulting spectrum is evaluated with a simple model consisting of a parallel arrangement of an ohmic resistance and a capacitor. The sample cross section of the phosphoric acid-doped membrane is measured immediately before the sample mounting. To measure the temperature dependence, the test cell is brought to the desired temperature in an oven and controlled by means of a Pt-100 thermoelement positioned in the immediate vicinity of the sample. On attainment of the temperature, the sample is kept at this temperature for 10 minutes before the start of the measurement.

EXAMPLES

Example 1

95 g para-PBI/PPA solution (BASF Fuel cell, 1.6 wt % of para-PBI) was pre-heated at 160° C. under dry nitrogen. 5 g meta-PBI powder (IV=0.5 dL/g measured a 0.2 g/dL in concentrated sulfuric acid, 100 mesh) was added to the above pre-heated para-PBI/PPA solution and mixed with overhead stirrer at 50 rpm for 4 hours. 5 ml of 85% phosphoric acid was added dropwise to reduce the solution viscosity. Slight vacuum was applied to remove the bubbles from the system. The temperature was increased to 200° C. for 30 minutes, and then was cast using a 25 mil gap casting blade onto clear glass plates. The cast membrane was hydrolyzed at 25° C., 55% relative humidity (RH) for 24 hours.

Example 2

3.214 g tetraaminobiphenyl (TAB, 15 mmol) and 2.492 g terephthalic acid (TPA, 15 mmol) was added to 137 g polyphosphoric acid [PPA concentration 116%], mixed with overhead stirrer, purged with dry nitrogen. The mixture was heated at 150° C. for 3 hours, 170° C. for 3 hours, and then 195° C. for 12 hours.

5 ml of 85% phosphoric acid was added dropwise to reduce the solution viscosity. Temperature increased to 220° C. for half an hour before the casting.

The polymer solution (having a total solids content of FBI of 3.26 wt %) was casted onto clear glass plates. The cast membrane was hydrolyzed in 65% phosphoric acid bath for 24 hours. This example corresponds to the membranes known from International patent application WO 02/081547.

The mechanical properties of the membranes were measured by cutting dumb bell specimens (ASTM D683 Type V) from the bulk membrane using a cutting press. Tensile properties were measured using an Instron Tensile Tester (5543A) with a 10N load cell. All measurements were made at room temperature on samples preloaded to 0.1N with a crosshead speed of 5 mm per minute.

| sample | Thickness (mm) | Strain at Max. Load (mm/mm) | Young's Modulus (MPa) | Modulus (MPa) |
|---|---|---|---|---|
| Example 1 | 0.43 | 2.334 | 4.904 | 1.562 |
| Example 2 | 0.36 | 4.908 | 1.863 | 0.865 |

The higher modulus means that higher resistance to flow/creep of the membranes is obtained.

Examples of polymer addition process:

Example 3

95 g para-PBI/PPA solution (1.6 wt % of para-PBI solids) was pre-heated at 160° C. under dry nitrogen. 5 g meta-PBI powder (IV=0.5 dL/g measured at 0.2 g/dL in concentrated sulfuric acid, 100 mesh) was added to the above pre-heated para-PBI/PPA solution and mixed with overhead stirrer at 50 rpm for 4 hours. 5 ml of 85% phosphoric acid was added dropwise to reduce the solution viscosity. Slight vacuum was applied to remove the bubbles from the system. The temperature was increased to 200° C. for 30 minutes, and then was cast using a 25 mil gap casting blade onto clear glass plates. The cast solution was hydrolyzed at 25° C., 55% relative humidity (RH) for 24 hours to produce a membrane with the properties listed below.

Example 4

95 g para-PBI/PPA solution (1.6 wt % of para-PBI solids) was pre-heated at 160° C. under dry nitrogen. 5 g meta-PBI powder (IV=0.5 dL/g measured at 0.2 g/dL in concentrated sulfuric acid, 100 mesh) was mixed with 15 g polyphosphoric acid, then added to the above para-PBI/PPA solution, and mixed with an overhead stirrer at 50 rpm for 4 hours. Slight vacuum was applied to remove the bubbles from the system. The temperature was increased to 200° C. for 30 minutes before casting. The polymer solution was cast onto clear glass plates and hydrolyzed at 25° C., 55% RH for 24 hours to produce a membrane with the properties listed below.

Example 5

95 g para-PBI/PPA solution (1.6 wt % of para-PBI solids) was pre-heated at 160° C. under dry nitrogen. 5 g para-PBI powder (IV=2.3 dL/g measured at 0.2 g/dL in concentrated sulfuric acid, 100 mesh) was added to the above para-PBI/PPA solution and mixed with an overhead stirrer at 50 rpm for 4 hours. 5 ml of 85% phosphoric acid was added dropwise to reduce the solution viscosity. Slight vacuum was applied to remove the bubbles from the system. The temperature was increased to 200° C. for 30 minutes before casting. The polymer solution was cast onto clear glass plates and hydrolyzed at 25° C., 55% RH for 24 hours to produce a membrane with the properties listed below.

| sample | Polymer content (%) | Proton Conductivity (S/cm) | Tensile Strength (MPa) | Strain at Max. Load (mm/mm) | Young's Modulus (MPa) |
|---|---|---|---|---|---|
| Example 3 | 13.3 | 0.272 | 1.51 | 2.33 | 4.90 |
| Example 4 | 9.7 | 0.275 | 1.36 | 3.08 | 2.72 |
| Example 5 | 13.1 | 0.270 | 1.30 | 1.73 | 1.84 |

What is claimed is:
1. A proton-conducting polymer membrane based on polyazoles, obtainable by a process comprising steps of
A) providing a monomer solution and/or dispersion including
(i) one or more aromatic tetraamino compounds and either (ii) one or more aromatic carboxylic acids or esters thereof which contain at least two acid groups per carboxylic acid monomer,
or (iii) one or more aromatic and/or heteroaromatic diaminocarboxylic acids, in polyphosphoric acid to form a solution and/or dispersion
B) heating the monomer solution and/or dispersion from step A), and polymerizing until a formed polyazole polymer having an intrinsic viscosity of at least 0.8 dl/g is obtained,
C) adding of one or more polyazole polymer to the polyphosphoric acid and the formed polyazole polymer of step B), the added one or more polyazole polymer being different from the formed polyazole polymer of step B),
D) heating the mixture from step C),
E) applying a membrane layer using the mixture heated according to step D) on a carrier,
G) treating the membrane layer formed in the presence of water and/or moisture to provide a membrane including at least a formed polyazole and an added polyazole being different from the formed polyazole, and
H) removing the membrane from the carrier;
wherein a total content of all polyazole polymers in the membrane is at least 10% by weight and up to about 25% by weight and said total content includes any acids and water being present, said total content excluding however any optional additives and wherein the membrane has a Young Modulus of at least 4.5 MPa, and
wherein the monomers in the monomer solution and/or dispersion of step A accounts for less than 10% by weight of the total solid content of all polyazole polymers in the membrane.

2. The membrane as claimed in claim 1, wherein the aromatic and heteroaromatic tetraamino compounds are selected from 2,3,5,6-tetraaminopyridine, 3,3',4,4'-tetraaminodiphenylsulfone, 3,3',4,4'-tetraaminodiphenyl ether, 3,3',4,4'-tetraaminobiphenyl, 1,2,4,5-tetraaminobenzene, 3,3',4,4'-tetraaminobenzophenone, 3,3',4,4'-tetraaminodiphenylmethane, 3,3',4,4'-tetraaminodiphenyldimethyl-methane, or the salts of the aforementioned compounds.

3. The membrane as claimed in claim 1, wherein the diaminocarboxylic acids are selected from diaminobenzoic acid and the mono and dihydrochloride derivatives of said acid, or 1,2-diamino-3'-carboxy acid 4,4'-diphenyl ether.

4. The membrane as claimed in claim 1, wherein the one or more aromatic carboxylic acids or esters thereof includes an aromatic tricarboxylic acid selected from 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid, or any one mixture thereof.

5. The membrane as claimed in claim 1, wherein the one or more, aromatic carboxylic acids or esters thereof includes an aromatic tetracarboxylic acid selected from 3,5,3',5'-biphenyltetracarboxylic acid, benzene-1,2,4,5-tetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid, or any one mixture thereof.

6. The membrane as claimed in claim 1, wherein the aromatic carboxylic acids include heteroaromatic carboxylic acids, including their respective esters, or the acid anhydrides of said heteroaromatic acids, or the acid chlorides of said heteroaromatic acids, wherein the heteroaromatic carboxylic acids include at least one nitrogen in the aromatic moiety.

7. The membrane as claimed in claim 6, wherein,the heteroaromatic carboxylic acids are selected from pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, each of their C1-C20-alkyl esters, their C5-C12-aryl esters, their acid anhydrides or their acid chlorides, or any one mixture thereof.

8. The membrane as claimed in claim 1, wherein the polyphosphoric acid are concentrated grades of phosphoric acid ($H_3PO_4$) above 95% in which the individual $PO_4$ units are polymerized and the polyphosphoric acids can be expressed by the formula $H_{n+2}P_nO_{3n+1}(n>1)$.

9. The membrane as claimed in claim 8, wherein the polyphosphoric acid $[H_{n+2}P_nO_{3n+1}(n>1)]$ have a content, calculated as $P_2O_5$ (by acidimetry), of at least 70% by weight and not more than 86% by weight.

10. The membrane as claimed in claim 1, wherein the monomers in the monomer soltution and/or dispersion of step A accounts for less than 10% by weight, of the of the total content of all polyazole polymers in the membrane.

11. The membrane as claimed in claim 1, wherein the polymers based on polyazole being formed in step B) comprise repeat units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

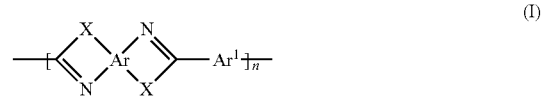

(I)

(II)

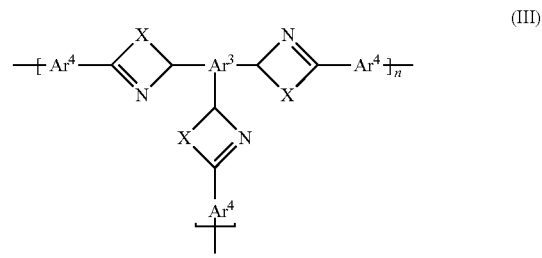

(III)

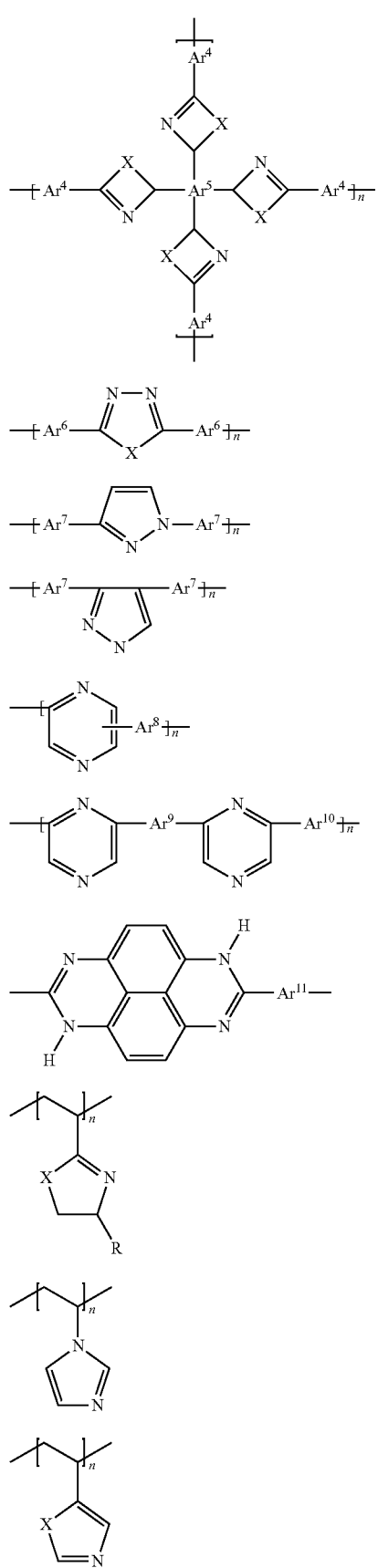
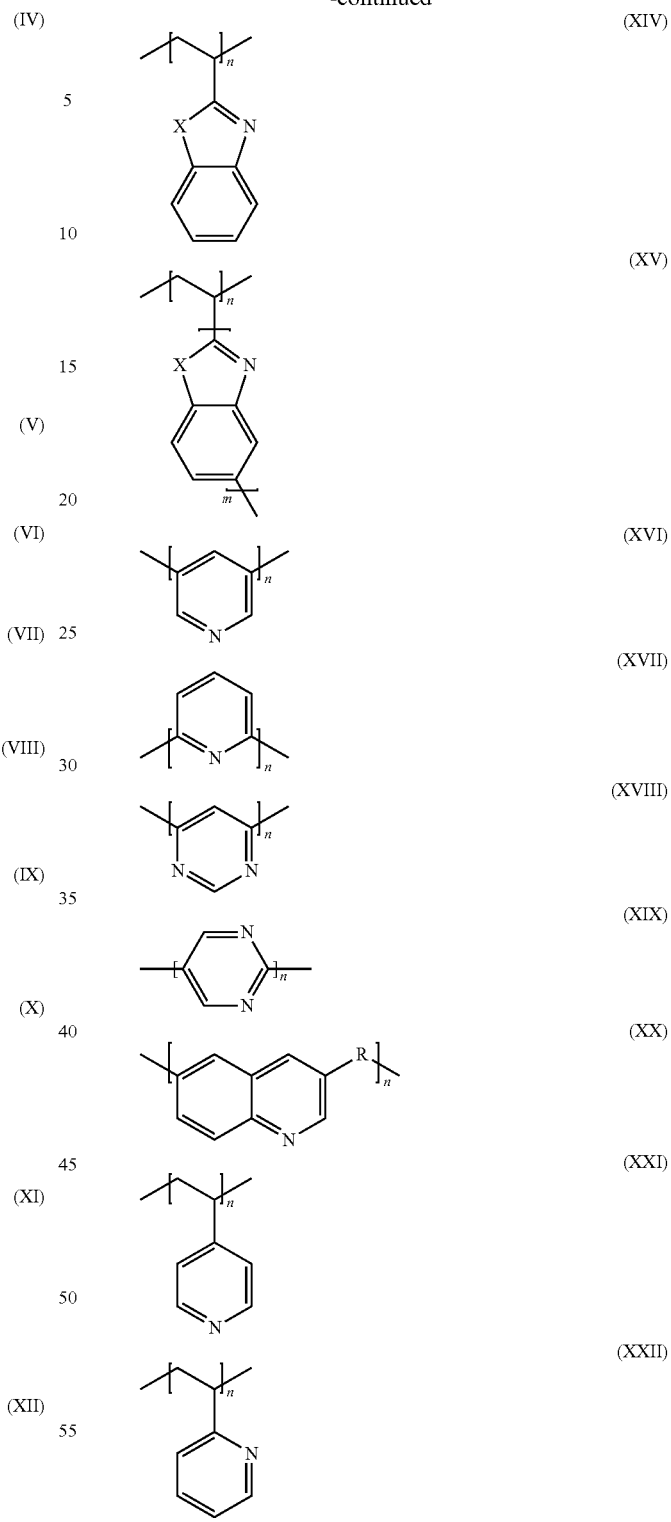
in which
Ar are the same or different and are each a tetravalent aromatic or heteroaromatic group which may be mono- or polycyclic,
Ar¹ are the same or different and are each a divalent aromatic or heteroaromatic group which may be mono- or polycyclic, Ar² are the same or different and are each a di- or trivalent aromatic or heteroaromatic group which may be mono- or polycyclic, Ar³ are the same or different and are each a trivalent aromatic or heteroaromatic group which may be mono- or polycyclic, Ar⁴ are the same or different and are each a trivalent aromatic or heteroaromatic group which may be mono- or polycyclic, Ar⁵ are the same or different and are each a tetravalent aromatic or heteroaromatic group which may be mono- or polycyclic, Ar⁶ are the same or different and are each a divalentaromatic or heteroaromatic group which may be mono- or polycyclic, Ar⁷ are the same or different and are each a divalent aromatic or heteroaromatic group which may be mono- or polycyclic, Ar⁸ are the same or different and are each a trivalent aromatic or heteroaromatic group which may be mono- or polycyclic, Ar⁹ are the same or different and are each a di- or tri- or tetravalent aromatic or heteroaromatic group which may be mono- or polycyclic, Ar¹⁰ are the same or different and are each a di- or trivalent aromatic or heteroaromatic group which may be mono- or polycyclic, Ar¹¹ are the same or different and are each a divalent aromatic or heteroaromatic group which may be mono- or polycyclic, X are the same or different and are each oxygen, sulfur or an amino group which bears a hydrogen atom, a group having 1-20 carbon atoms, preferably a branched or unbranched alkyl or alkoxy group, or an aryl group as further radical, R is the same or different and is hydrogen, an alkyl group or an aromatic group, with the proviso that R in formula (XX) is not hydrogen, and n, m are each an integer greater than or equal to 10.

12. The membrane as claimed in claim 1, wherein the polymers based on polyazole being formed in step B) comprise repeat benzimidazole units of the formula

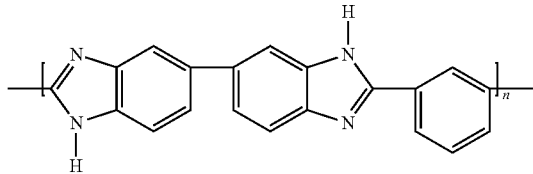 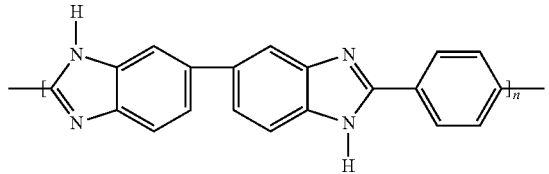

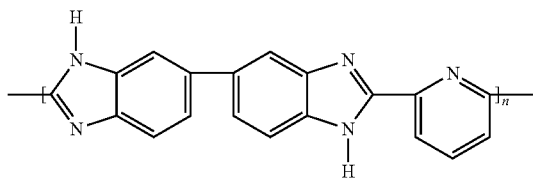 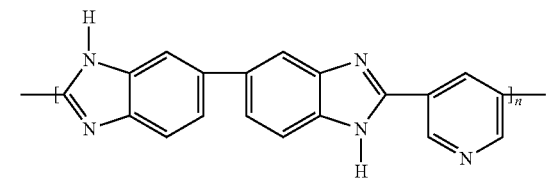

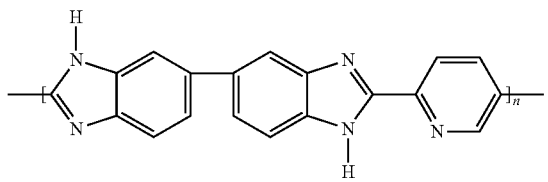 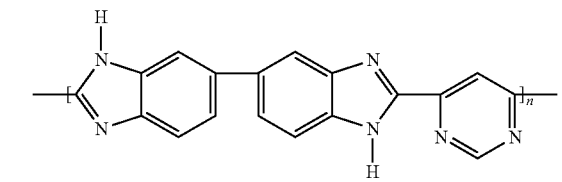

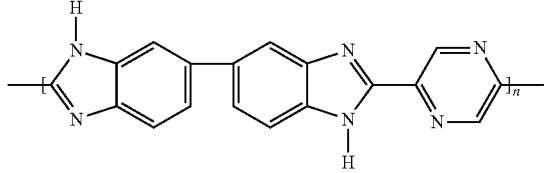 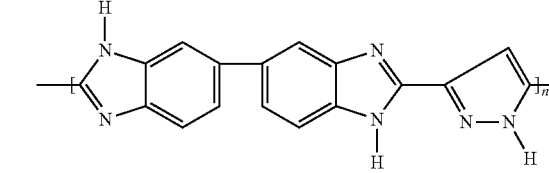

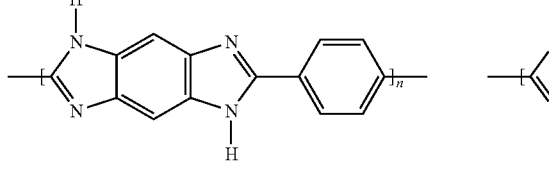 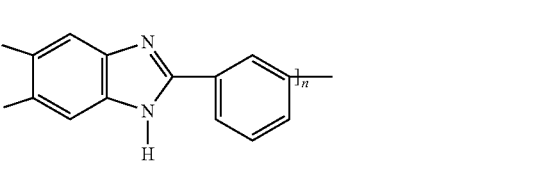

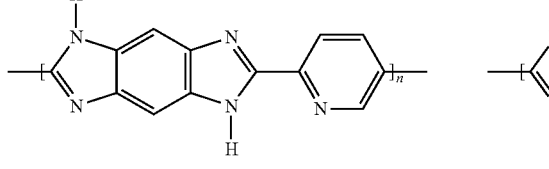 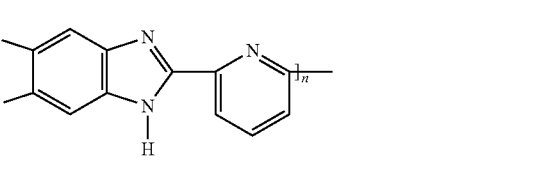

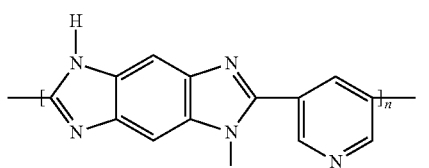
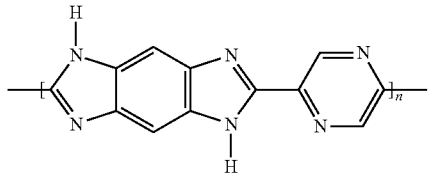
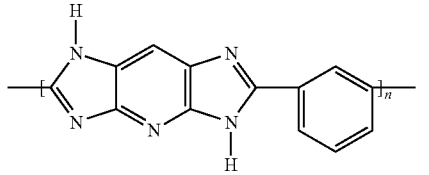
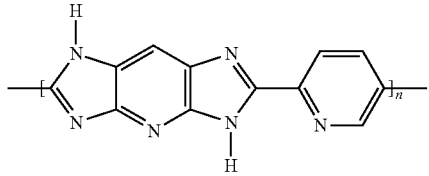
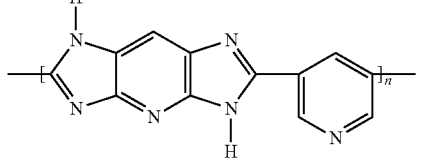
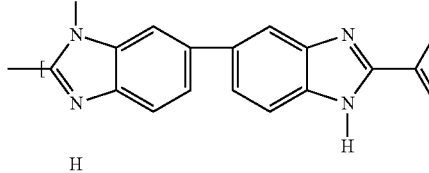
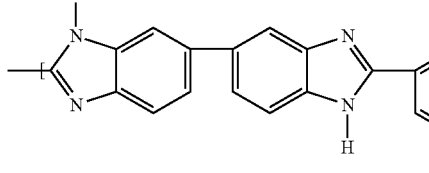

where n and m are each an integer greater than or equal to 10.

13. The membrane as claimed in claim 1, characterized in that the polyazole polymer being formed in step B) is meta-polybenzimidazole and/or para-polybenzimidazole.

14. The membrane as claimed in claim 1, characterized in that the membrane obtained in step C) or D) is treated in the presence of moisture at temperatures and for a period until the membrane is self-supporting and can be removed from the carrier without damage.

15. The membrane as claimed in claim 1, characterized in that the carrier selected in step C) is an electrode and the treatment in step E) is such that the membrane formed is no longer self-supporting.

16. The membrane as claimed in claim 1, wherein a membrane having a thickness of 20 and 4000 μm is obtained in step C).

17. The membrane as claimed in claim 1, wherein the membrane formed by step E) has a thickness between 15 and 3000 μm.

18. The membrane as claimed in claim 1, wherein the total solid content of the polyazole polymer in the membrane is at least 8% by weight.

19. A membrane-electrode unit comprising at least two electrodes and at least one membrane as claimed in claim 1.

20. A fuel cell comprising one or more membrane-electrode units as claimed in claim 19.

21. The membrane as claimed in claim 1, wherein the aromatic and heteroaromatic tetraamino compounds of step A) are selected from 2,3,5,6-tetraaminopyridine, 3,3',4,4'-tetraaminodiphenylsulfone, 3,3',4,4'-tetraaminodiphenyl ether, 3,3',4,4'-tetraaminobiphenyl, 1,2,4,5-tetraaminobenzene, 3,3',4,4'-tetraaminobenzophenone, 3,3',4,4''-tetraaminodiphenylmethane or 3,3',4,4'-tetraaminodiphenyldimethyl-methane or the salts of the aforementioned compounds, and the heteroaromatic carboxylic acids are selected from pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, or their $C_1$-$C_{20}$-alkyl esters or their $C_5$-$C_{12}$-aryl esters, or their acid anhydrides or their acid chlorides.

22. An electrode having a proton-conducting polymer membrane coating based on polyazoles, obtainable by a process comprising the steps of A) providing a monomer solution and/or dispersion including
  (i) one or more aromatic tetraamino compounds and either (ii) one or more aromatic carboxylic acids or esters thereof which contain at least two acid groups per carboxylic acid monomer,
  or (iii) one or more aromatic and/or heteroaromatic diaminocarboxylic acids,
  in polyphosphoric acid, B) heating the monomer solution and/or dispersion from step A), preferably under inert gas, and polymerizing until a formed polyazole polymer having an intrinsic viscosity of at least 0.8 dl/g is obtained, C) adding one or more polyazole polymer to the polyphosphoric acid and the polymer formed in step B, the added one or more polyazole polymer being different from the formed polyazole polymer of step B), D) heating the mixture from step C), E) applying a membrane layer using the mixture heated according to step D) on an electrode, F) optionally heating the membrane layer on the electrode obtained from step E), and G) treating the membrane layer formed in step E) or optionally step F) in the presence of water and/or moisture to provide on the electrode a membrane including at least a formed polyazole and an added polyazole being different from the formed polyazole, wherein a total solid content of all polyazole polymers in the membrane is at least 10% by weight and up to about 25% by weight and said total content includes any acids and water being present, said total content excluding any optional additives, and wherein the membrane has a Young Modulus of at least 4.5 MPa, and wherein the monomers in the monomer solution and/or dispersion of step A accounts for less than 10% by weight of the total solid content of all polyazole polymers in the membrane.

23. The electrode as claimed in claim 22, the membrane having a thickness between 2 and 3000 µm.

24. A membrane-electrode unit comprising at least one electrode as claimed in claim 22.

* * * * *